W. Foskel.
Forming Bats.
No 538 Reissued Mar. 23, 1858.
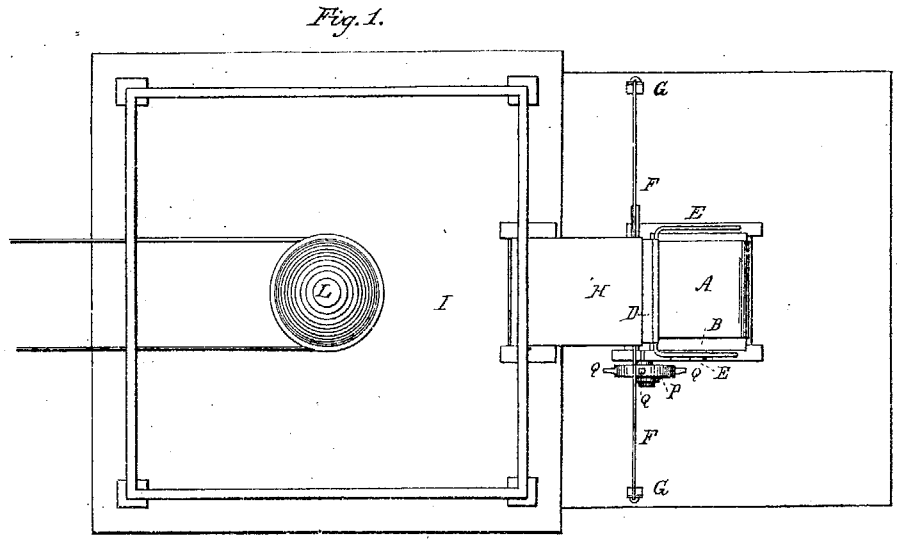
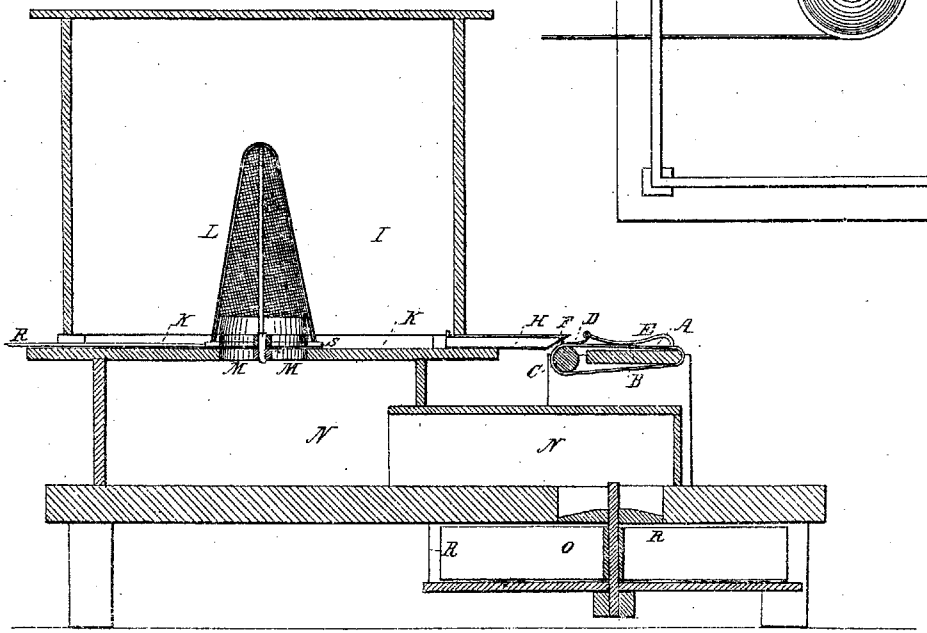

UNITED STATES PATENT OFFICE.

WILLIAM FOSKET, OF MERIDEN, CONNECTICUT.

IMPROVEMENT IN MACHINERY FOR MAKING HAT-BODIES.

Specification forming part of Letters Patent No. 4,363, dated January 23, 1846; Reissue No. 538, dated March 23, 1858.

*To all whom it may concern:*

Be it known that I, WILLIAM FOSKET, of Meriden, in the county of New Haven and State of Connecticut, formerly of Ware, in the county of Hampshire and State of Massachusetts, have invented certain new and useful Improvements in Manufacturing Hat-Bodies; and I do hereby declare that the following is a full, clear, and exact description of my said invention, reference being had to the accompaying drawings, in which—

Figure 1 represents a top view of my machine with the cover of the wind-case removed to permit the interior thereof to be seen, and Fig. 2 represents a vertical longitudinal sec tion of the machine.

Hat-bodies have for many years been manufactured by a hand process. In this process the fibers of fur or other material employed are picked apart and projected into the air by the hatters' bow operated by the workman, and are caused to deposit upon the workman's table, or hurdle, as it is called, in the form of a flat bat whose shape, size, and thickness at different parts are determined by the workman. The bats thus formed are made up by hand into hat-bodies, whose relative thickness at different parts depends upon the thickness of the bats, which is varied as required by the workman who makes them. This mode of manufacture is objectionable on account of its tediousness, and on account of the great amount of labor and skill required in the operatives; hence various machines have been devised for manufacturing hat-bodies upon the general mode of operation of disintegrating a fibrous material and disseminating its fibers in air by means of a mechanical picking apparatus, and of collecting the picked fibers in the form of a bat upon a pervious exhausted surface sufficiently open to permit air to pass through it, but close enough to retain the fibers upon it. These machines may be divided into two great classes—viz., that class in which the fibers are collected upon a pervious exhausted surface in the form of a flat bat or web, which is afterward made into a hat-body by winding it upon a former of the proper size and shape, and that class in which the fibers are collected upon a pervious exhausted former of the size and shape of the hat-body to be made. In both instances the hat-bodies are hardened after they are formed. The mode of manufacture pursued with machines of the first-class is objectionable, principally because it is indirect and because it requires much machinery, labor, and experience. The mode of manufacture pursued with machines of the second class is also objectionable, principally because no method has hitherto been devised by which the distribution of the fibrous material in the hat-body, so as to obtain a hat-body having the variation in thickness at its different parts required by the trade and obtained by the hand process, can be obtained automatically.

My invention relates particularly to the manufacture of hat-bodies with machines of of the second class; and its object is to produce by a direct process hat-bodies in which the requisite distribution of the fur fibers is effected automatically, so that the labor of boys or of persons unskilled in the manipulation of the hatters' bow can be substituted for that of skillful hatters.

In the mode of operation pursued by me the hat-bodies are formed directly upon a reticulated or perforated former of the shape and size of the hat-body to be produced, by causing picked fur fibers to impinge against its surface and to be held there until the operation is completed; and the distribution of fibers in the hat-body, or the regulation of its thickness, is effected automatically by supplying a larger quantity of picked fibers to the parts of the former which correspond with the brim of the hat and lower portion of the crown or position of the band than to the other parts of the former. In the machinery which I have devised for this purpose for forming conical hat-bodies the fur is picked apart and its fibers are projected into an inclosed passage or conductor by a mechanical picking apparatus. They are conducted by this inclosed passage to a rotating perforated conical former, from the interior of which air is exhausted by a centrifugal fan. The inclosed passage or conductor has openings in it through which currents of air enter to supply the exhaust, and these openings are situated in such positions that the currents of air entering through them act upon the fur fibers, proceeding from the picking apparatus and impel them toward the conical former. The fur fibers proceeding toward the conical former impinge these upon and are held there by the pressure of the air. The picker is situated opposite a section of the lower part of the cone, and the current of impelled fur projected by it into the conductor is broad as it leaves the picker, and has then but little height or thickness, while the height of the conical former which stands erect is many times greater than the height or thickness of the current of fur as it leaves the picker; hence the current of impelled fur tends to impinge against the lower part of the conical former and to deposit thereupon in a band or belt, as the conical former is rotated to turn in succession the different parts of its surface toward the current of impelled fur. This tendency of the fur to deposit in a belt or band at the lower part of the conical former is modified by deflecting a portion of the impelled current of fur upward from its direct course as it proceeds from the picking apparatus, thus causing a part of the fur to impinge against the upper portion of the conical former while the larger part impinges against the lower portion thereof, so that as the cone is turned to present in succession every portion of its surface to the current of impelled fur the latter is supplied in larger quantities toward the base of the conical former than toward the tip thereof, whereby a bat is produced in which the fur is distributed in the required manner.

The mode of operation thus described is sufficient to produce a conical bat of fur fibers in which the latter are distributed in the required manner, but the texture of the mass is too loose to permit it to be handled without injury when the cone is removed from the exhaust; hence I subject the bat while on the cone on which it is formed to a hardening process. The hardening is effected by means of conical rollers which press upon the bat as the cone revolves and compact it sufficiently to enable the cone with the bat upon it to be removed from the exhaust, so that the bat may be got ready for the after and well-known process of sizing by felting.

In machines for manufacturing hat-bodies it has been customary to employ toothed pickers of various constructions for the purpose of disintegrating the fibrous material and disseminating the fibers in air. Such pickers are advantageous on account of the rapidity with which they do their work, but their employment has been objected to by hatters as tending to injure the material and as disadvantageous in this respect when compared with the hatters' bow. In order, therefore, to enable me to pick the material in cases in which it is desirable to produce hat-bodies of the best quality, I have deemed it expedient to use in my machine a picker, consisting of a bow-string and an instrument to cause the same to vibrate by mechanical means, which is used in connection with a suitable feeding and nipping apparatus, so as to operate upon the material in a manner analogous to a hatter's bow.

The machinery represented in the accompanying drawing exemplifies my invention. In it the fibrous material of which the bat is to be fabricated is placed in sufficient quantities upon an endless feeding cloth or apron, A, which rests and moves upon or over the upper surface of a suitable table, B, and is caused to revolve by passing around a roller, C, which is arranged in front of the table and operated by any proper means. Just above that portion of the feeding-cloth which rests upon the upper surface of the roller C a spring guide-plate, D, is arranged so as to rest in contact, or nearly so, with the feeding cloth, the said guide-plate being supported in position by suitable springs, E E, or other contrivances of like nature, which permit it to rise above the cloth to the degree required to permit the passage of the fibrous material into the machine, and at the same time to hold it to allow the proper action of a bow-string, E, stretched in front of the guide-plate and upon the tops of spring-posts G G. A suitable passage or tube, H, leads from the vicinity of the bow-string to what may be termed as the forming or wind chamber I, this latter being a square or circular box of convenient dimensions, around and through the lower part of each of the sides of which various elongated orifices, K, are each to permit the external atmosphere to have access to the interior of the chamber. Upon the central part of the bottom of the chamber a conical frame, L, of wire is raised, the same being of the size necessary for the formation of the hat-body. This frame is covered on the outside with muslin or fine wire-gauze or other suitable material of similar character, and while in operation it should have a continued slow rotary movement in a horizontal direction imparted to it by a band, R, operating around a pulley, S, applied to the said frame, as seen in Fig. 2. By giving to the conical gauze-frame a rotary motion the deposition of the fibers will be more evenly formed upon it than it would if it were stationary. That part of the bottom of the wind-chamber situated within the gauze-frame opens by one or more suitable passages, M, Fig. 2, into a box or pipe or chamber, N, which leads to a fan-blower or wind-wheel, O, placed in any convenient position and revolved by any proper mechanism applied to it. The bow-string is operated by means of a wheel, P, arranged under the same and having a series of teeth, Q Q, extending from its circumference, and which comes in contact with the string as the wheel is revolved, and produces the whipping or bow-string operation upon the fibrous material similar to that usually effected by hand process in bowing. The machinery being put in motion, the fan-blower or wheel draws a powerful current of air through the orifices K and tube H and into the wind-chamber, from whence it rushes through the meshes of the conical frame and is received into the case R, surrounding the fan-wheel O, and finally discharged therefrom by the action of the said wheel. The filaments of the fibrous material separated from each other and projected by the bow-string are carried along with the current of air which enters through the tube H into the wind-chamber and toward the gauze-frame, upon which they pile or overlay each other, and upon which they are to be pressed and upon each other by revolving conical rollers or other proper contrivances. The process is thus carried on until a sufficient quantity of the fibrous material to form the hat-body is deposited upon the conical gauze-frame, from which it is afterward to be removed and felted or treated in the usual manner.

In the operation of the machinery thus described, the current of fur impelled along the conductor, formed by the tube H and chamber I, by the combined action of the picker and the current of air entering the conductor at the picker, proceeds toward the section of the lower part of the conical former which is opposite the picking apparatus. In its passage to this portion of the conical former it is acted upon by the currents of air which enter the conductor through the orifices K at its bottom and set toward the surface of the conical former, toward its tip as well as toward its base. Such of these currents as set toward the upper portion of the conical former deflect the fur fibers upward, thus wafting a portion toward the tip of the conical former, while the larger portion pursues its direct course toward the lower part thereof. This deflection of the current upward is furthered by the unequal obstruction of the openings or perforations in the conical former by the accumulation of fur fibers. As the operation proceeds, the fur fibers accumulate more rapidly from the above-mentioned causes upon the lower portion of the conical former than upon its upper portion; hence the current of air passing toward and through its lower portion grow weaker faster than those which pass toward and through its upper portion, and thus the proportion of fibers supplied to the upper portion of the conical former is greater toward the close of the operation than at its commencement. The relative quantities of fur fibers which are thus supplied to different portions of the former depend upon the form and dimensions of the conductor and upon the extent and position of the openings by which the currents of air are admitted to it.

In the machine I have described as exemplifying my invention the conductor entirely surrounds the former, and in this case it is necessary to admit currents of air at all sides of its bottom as well as at the picker, so as to waft upward the fibers of fur which, if there was but one opening at the picker to admit the currents of air, would deposit in greater or less quantities upon those parts of the bottom of the conductor which were not swept over by the currents proceeding from that one opening to the former.

The invention which I have described is not of necessity limited to machinery of the precise form and construction represented in the drawings, as these may be varied without affecting the principle of my invention to meet the views of different manufacturers.

Having thus described my improvement in the manufacture of hat-bodies, I deem it proper to state that I am aware that mechanical pickers of various constructions have been used in connection with pervious surfaces and exhausting-fans in the manufacture of hat-bodies, and therefore do not claim such devices separately or in their pre-existing combinations as my invention; but

What I claim as my invention, and desire to secure by Letters Patent, is—

1. The herein-described automatic method of forming hat-bodies having the required variation in thickness at their different parts by supplying picked fibers to an exhausted former of the size and shape required, in such manner that a larger portion of picked fibers is supplied to that part of the former which corresponds with the thickest portion of the hat-body and a less portion to the other parts of the former, substantially as herein set forth.

2. The combination of a picking apparatus, a hat-body former, an air-exhausting apparatus, and a conductor, the whole combined substantially as herein set forth.

3. A bow-string picking apparatus constructed and operating substantially as herein set forth, to pick fur presented to it by a suitable feeding and nipping apparatus.

In testimony whereof I have hereunto subscribed my name.

WM. FOSKET.

Witnesses:

EDWIN HUBBARD,
S. B. PARMELEE.